(12) United States Patent
Gane et al.

(10) Patent No.: US 8,821,628 B2
(45) Date of Patent: Sep. 2, 2014

(54) METHOD FOR IMPROVING OPACITY

(75) Inventors: Patrick A. C. Gane, Rothrist (CH);
Matthias Buri, Rothrist (CH); Samuel Rentsch, Aarburg (CH)

(73) Assignee: Omya International AG, Oftringen (CH)

( * ) Notice: Subject to any disclaimer, the term of this patent is extended or adjusted under 35 U.S.C. 154(b) by 228 days.

(21) Appl. No.: 13/380,683

(22) PCT Filed: Jun. 29, 2010

(86) PCT No.: PCT/IB2010/052963
§ 371 (c)(1),
(2), (4) Date: Dec. 23, 2011

(87) PCT Pub. No.: WO2011/001374
PCT Pub. Date: Jan. 6, 2011

(65) Prior Publication Data
US 2012/0097069 A1 Apr. 26, 2012

Related U.S. Application Data

(60) Provisional application No. 61/270,488, filed on Jul. 8, 2009.

(30) Foreign Application Priority Data

Jul. 1, 2009 (EP) .................................... 09164353

(51) Int. Cl.
*C09C 1/02* (2006.01)
*D21H 19/36* (2006.01)
*D21H 19/38* (2006.01)

(52) U.S. Cl.
CPC ............. *C09C 1/022* (2013.01); *C01P 2006/22* (2013.01); *C01P 2004/62* (2013.01); *C01P 2006/60* (2013.01); *C01P 2006/12* (2013.01); *C01P 2004/61* (2013.01); *D21H 19/385* (2013.01)
USPC .......................................... 106/465; 106/464

(58) Field of Classification Search
CPC ..... C09C 1/022; C09C 3/041; C01P 2006/60; D21H 19/385
USPC ................................. 106/464, 465
See application file for complete search history.

(56) References Cited

U.S. PATENT DOCUMENTS

| | | | | |
|---|---|---|---|---|
| 3,989,195 A | * | 11/1976 | Falcon-Steward | 241/16 |
| 4,035,257 A | * | 7/1977 | Cherney | 510/531 |
| 4,242,318 A | * | 12/1980 | Brahm et al. | 423/430 |
| 5,080,717 A | | 1/1992 | Young | |
| 5,296,002 A | | 3/1994 | Passaretti | |
| 5,449,402 A | | 9/1995 | Whalen-Shaw | |
| 5,647,902 A | | 7/1997 | Wu | |
| 5,972,088 A | | 10/1999 | Krishnan et al. | |
| 2012/0142842 A1 | * | 6/2012 | Jacquemet et al. | 524/425 |
| 2012/0289639 A1 | | 11/2012 | Buri et al. | |

FOREIGN PATENT DOCUMENTS

| | | | |
|---|---|---|---|
| DE | 19820122 A1 | | 11/1999 |
| DE | 19820122 A1 | * | 11/1999 |
| EP | 1916569 A1 | | 4/2008 |
| GB | 1001881 | | 8/1965 |
| GB | 1073943 | | 6/1967 |
| WO | WO 2007012935 A2 | * | 2/2007 |

OTHER PUBLICATIONS

The International Search Report dated Sep. 9, 2010 for PCT Application No. PCT/IB2010/052963.
The Written Opinion of the International Searching Authority for PCT Application No. PCT/IB2010/052963.
The European Search Report dated Sep. 3, 2009 for related European Application No. 09164353.6.
The International Preliminary Report on Patentability dated Jan. 12, 2012 for related PCT Application No. PCT/IB2010/052963.
Chinese Office Action dated Mar. 4, 2013 for related Chinese Application No. 201080036140.0.
Notice of Opposition for European Patent No. 2,292,701, [2013].
Analysis of Omyacarb Extra C1.
Lü ckert Pigment + Füllstoff Tabellen 6. Auflage Vincentz Verlag Hannover 2002, 738-739.
Stadt Reinheim—Trinkwasser Durchschnittswerte 2007.
Energieversorgung Limburg GmbH, Untersuchung auf chemisch-technische Inhaltsstoffe des Trinkwassers, Standardanalyse 2013.
RheinEnergie, Trinkwasseranalyse, Ausgabe 2014.
RWW, Wasserwerk Essen-Kettwig,Trinkwasserdurchschnittsanalyse.
RWW, Wasserwerk Dorsten-Holsterhausen-Kettwig, Trinkwasserdurchschnittsanalyse.
Hollemann-Wiberg Lehrbuch der arnorganischen Chemie de Gruyter, 1985, pp. 716-720.
Hollemann-Wiberg Lehrbuch der arnorganischen Chemie de Gruyter, 1985, pp. 941-943.
Verordnung über die Qualität von Wasser für den memschlichen Gebrauch (Trinkwasserverordnung—TrinkwV 2001), May 21, 2001.
Umweltbundesamt Berlin "Integrierter Umweltschutz bei bestimmten industriellen Tätigkeiten-Anlagen zur Oberflächenbehandlung durch Appretieren, Imprägnieren, Bedrucken, Tränken, Beschichten", part II "Bedrucken" final report Mar. 2003.
J.H. Bos et al. "Das Papierbuch" ECA Pulp & Paper b.v., 1999, 374-379.
J. Dedek et al. "Le carbonate de chaux" Louvain 1966.

* cited by examiner

*Primary Examiner* — Anthony J Green
(74) *Attorney, Agent, or Firm* — Amster, Rothstein & Ebenstein LLP

(57) ABSTRACT

The present invention relates to a process for preparing an aqueous suspension of dispersed calcium carbonate, wherein the resulting coating of said suspension provides opaque properties or has a specific light scattering coefficient S. The invention further relates to compositions of such suspensions of dispersed calcium carbonate and to its use in the field of paper coatings and paper mass fillings as well as paints and plastic coatings.

27 Claims, No Drawings

METHOD FOR IMPROVING OPACITY

CROSS-REFERENCE TO RELATED APPLICATIONS

This application is U.S. National phase of PCT Application No. PCT/IB2010/052963, filed Jun. 29, 2010, which claims priority to European Application No. 09164353.6, filed Jul. 1, 2009 and U.S. Provisional Application No. 61/270,488, filed Jul. 8, 2009.

The present invention relates to a process for preparing an aqueous suspension of dispersed calcium carbonate, wherein the resulting coating of said suspension provides opaque properties or has a specific light scattering coefficient S. The invention further relates to compositions of such suspension of calcium carbonate and to its use in the field of paper coatings and paper mass fillings as well as paints and plastic coatings.

In practice, paper and paperboard products such as magazines, brochures, leaflets, packaging etc. are coated in order to give them beneficial optical properties such as opacity, brightness, sheet gloss and print gloss as well as printing quality or to change its physical properties. Formulations comprising calcium carbonate materials are notably known to impart opacity and brightness to paper by virtue of their light scattering characteristics and, thus, calcium carbonate materials are used in huge quantities as coatings but also as fillers, extenders and pigments for papermaking as well as aqueous lacquers and paints.

In the art, several approaches for improving the optical properties of coatings prepared from suspensions of calcium carbonate have been proposed. For example, GB 1,073,943 relates to a coating composition suitable for high-speed application to a substrate to form on said substrate a bright opaque film exhibiting good printing characteristics and controlled ink holdout. Said composition comprises an aqueous dispersion of a film-forming binder-matrix material, starch, and a particulate additive, and a discontinuous phase comprising globules of a water-immiscible organic liquid having a boiling-point above that of water. U.S. Pat. No. 5,449,402 describes functionally modified pigment particles prepared by mixing a flocculated pigment of kaolin clay or calcium carbonate with a modifier having charge sites opposite in sign to the charge sites of the flocculated pigment, wherein the flocculated pigment is an aqueous suspension of filter cake particles.

Especially for paper manufacture which uses calcium carbonate materials in paper coating formulations, it is advantageous to receive these materials in the form of aqueous suspensions. Since the transport of suspensions of calcium carbonate should, however, be economically viable, the quantity of water in the suspension or the volume of the suspension should be as small as possible. At the same time, the viscosity of the suspension should not be too low in order to prevent significant sedimentation of solid particles. Furthermore, the suspension should be sufficiently fluid (i.e. viscosity should be low enough) to be easily pumped from e.g. a goods wagon to e.g. a tank.

Several approaches for improving the properties of suspensions of calcium carbonate for transportation have been proposed in the art. For example, U.S. Pat. No. 3,989,195 describes a method of producing an easily pumpable aqueous suspension of a natural calcium carbonate material containing at least 60% by weight of particles smaller than 2 microns equivalent spherical diameter, wherein the method comprises the steps of forming an aqueous suspension of said natural calcium carbonate material and a minor amount of a compound which contains calcium ions or carbonate ions and has a solubility in water of at least 0.05 g per 100 ml of water at 25° C.; and thereafter deflocculating the natural calcium carbonate material in said aqueous suspension with a dispersing agent. DE 198 20122 describes sedimentation-resistant calcium carbonate suspensions, containing calcium carbonate, water and a wetting agent, and involves adding an ionic metal compound (I) as sedimentation inhibitor.

However, there is one specific problem which very often has significant impact on the optical properties of coatings made from suspensions comprising calcium carbonate materials, which are dispersed in water to form a stable suspension by means of a dispersing agent such as a polycarboxylate and/or a polyphosphate. As set out above, suspensions of calcium carbonate usually are further concentrated for transportation. The process of concentrating and the following diluting, e.g. in application, often results in a worsening of optical properties compared to the original suspension of such dispersed calcium carbonate, i.e. the suspension before concentrating and subsequent dilution. More precisely, the opacity of a resulting coating being reflected by the light scattering coefficient decreases during the concentrating of a suspension of dispersed calcium carbonate and the loss of opacity cannot be reversed after diluting the concentrated suspension of dispersed calcium carbonate to a desired lower solid content in the suspension. Consequently, the resulting coating of the diluted suspension of dispersed calcium carbonate provides a significantly decreased opacity only and a light scattering coefficient which is much lower than that of the resulting coating of the original suspension of dispersed calcium carbonate at equal solid content. The resulting poor opacity or the lowering of the light scattering coefficient is especially detrimental for applications in the field of paper making, coatings and mass fillings as well as paints and plastics.

Thus, there is a need in the art for providing a process which avoids the foregoing disadvantages and especially allows for improving the light scattering coefficient or the opacity of a resulting coating of a suspension of dispersed calcium carbonate being derived from diluting aqueous concentrated suspensions of dispersed calcium carbonate. In other words, it would be desirable to provide a method which leads to diluted suspensions of dispersed calcium carbonate wherein the resulting coating prepared from said suspension has a higher opacity or higher light scattering coefficient compared to prior art methods.

Accordingly, it is an objective of the present invention to provide a process for preparing an aqueous suspension of dispersed calcium carbonate wherein the resulting coating of said suspension has improved optical properties and especially an increased light scattering coefficient. Further objectives can be gathered from the following description of the invention.

The foregoing and other objectives are solved by the subject-matter as defined herein in claim 1.

Advantageous embodiments of the inventive method are defined in the corresponding sub-claims.

According to one aspect of the present application a process for preparing an aqueous suspension of dispersed calcium carbonate providing improved optical properties to coatings made thereof is provided, wherein the process comprises the following steps:

a) providing an aqueous suspension of dispersed calcium carbonate;

b) providing at least one alkali carbonate and/or alkali hydrogen carbonate, wherein the alkali ion is selected from potassium and/or sodium;

c) diluting said aqueous suspension of dispersed calcium carbonate with water; and d) before and/or during and/or after step c) contacting said aqueous suspension of dispersed calcium carbonate with said at least one alkali carbonate and/or alkali hydrogen carbonate.

The inventors surprisingly found that the foregoing process according to the present invention leads to a suspension of dispersed calcium providing a light scattering coefficient S to coatings made thereof being higher than the light scattering coefficient S of a corresponding coating prepared from a suspension of dispersed calcium carbonate being treated the same way but without contacting it with said at least one alkali carbonate and/or alkali hydrogen carbonate (step d)). More precisely, the inventors found that the optical properties of a coating prepared from a suspension of dispersed calcium carbonate being obtained by diluting a corresponding concentrated suspension with water for adjusting the desired solid content level can be improved by the addition of defined alkali carbonate(s) and/or alkali hydrogen carbonate(s).

It should be understood that for the purposes of the present invention, the following terms have the following meanings:

In accordance with the present invention, the "suspension of calcium carbonate" comprises ground (or natural) calcium carbonate (GCC) and/or precipitated calcium carbonate (PCC), which is also known as synthetic calcium carbonate.

"Ground calcium carbonate" (GCC) in the meaning of the present invention is a calcium carbonate obtained from natural sources including marble, chalk or limestone, and processed through a treatment such as grinding, screening and/or fractionizing by wet and/or dry, for example, by a cyclone.

"Precipitated calcium carbonate" (PCC) in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution.

A "suspension" or "slurry" in the meaning of the present invention comprises insoluble solids and water and optionally further additives and usually contains large amounts of solids and, thus, is more viscous and generally of higher density than the liquid from which it is formed.

A suspension of "dispersed" calcium carbonate in the meaning of the present invention further comprises at least one dispersing agent and, thus, shows a lower viscosity after stirring for five minutes at 2 000 rpm by using a tooth disc stirrer having a diameter of 5 cm than the same suspension of calcium carbonate prepared without dispersing agent(s).

In accordance with the present invention the "light scattering coefficient" S is determined by a method described in US 2004/0250970, wherein the ability to scatter light is expressed by the Kubelka-Munk light scattering coefficient, further described in the publications of Kubelka and Munk (Zeitschrift für Technische Physik 12, 539, (1931)), and Kubelka (J. Optical Soc. Am. 38(5), 448, (1948) and J. Optical Soc. Am. 44(4), 330, (1954)) and U.S. Pat. No. 5,558,850. The description of this measuring method for determining the coefficient is incorporated herein by reference. It is to be understood that the "opacity" or "light scattering coefficient" of the aqueous suspension of dispersed calcium carbonate actually corresponds to the "opacity" or "light scattering coefficient" of the coating or film made from the suspension of dispersed calcium carbonate. In other words, the "opacity" or "light scattering coefficient" is measured or determined on the basis of a coating or film made from the suspension. In this respect, it is to be noted that the opacity is a joint function of the light scattering coefficient S and the light absorption coefficient K; i.e. the lower K, the more the opacity is directly related to S. In other words, effects observed on the opacity of materials having a high brightness are mainly a result of changes to S.

According to another aspect of the present invention, an aqueous suspension of dispersed calcium carbonate is provided, wherein said suspension is obtainable by the inventive process for preparing an aqueous suspension of dispersed calcium carbonate providing improved optical properties to a coating made thereof. According to another aspect, the present invention refers to the use of said aqueous suspension for coating paper, for mass filling or as a component in paints and plastics.

Another aspect of the present invention is directed to the use of at least one of the defined alkali carbonate(s) and/or alkali hydrogen carbonate(s) for controlling the optical properties and especially the light scattering coefficient S in a resulting coating prepared from a suspension of dispersed calcium carbonate. It is especially preferred that the light scattering coefficient S in a coating prepared from the diluted suspension of dispersed calcium carbonate being contacted with the at least one alkali carbonate and/or alkali hydrogen carbonate before and/or during and/or after diluting the suspension with water is higher than the light scattering coefficient S of the coating prepared from the same suspension being diluted the same way but in the absence of at least one alkali carbonate and/or alkali hydrogen carbonate.

According to one preferred embodiment of the present invention, the aqueous suspension of dispersed calcium carbonate provided in step a) has a solid content of between 35 wt.-% and 85 wt.-%, more preferably between 65 wt.-% and 80 wt.-% and most preferably between 68 wt.-% and 78 wt.-%, based on the total weight of the aqueous suspension of dispersed calcium carbonate of step a). According to one especially preferred embodiment of the present invention, the aqueous suspension of dispersed calcium carbonate provided in step a) is a concentrated aqueous suspension of dispersed calcium carbonate, which preferably has a solid content between 70 wt.-% and 78 wt.-%, based on the total weight of the aqueous suspension of dispersed calcium carbonate of step a).

According to another preferred embodiment of the invention, the at least one alkali carbonate and/or alkali hydrogen carbonate is selected from the group consisting of sodium carbonate, potassium carbonate, sodium hydrogen carbonate, potassium hydrogen carbonate or mixtures thereof. According to the present invention, said at least one alkali carbonate and/or alkali hydrogen carbonate is preferably sodium carbonate and/or potassium carbonate.

According to another preferred embodiment of the invention, said at least one alkali carbonate and/or alkali hydrogen carbonate is added in an amount of 0.001 wt.-% and 5 wt.-%, preferably between 0.025 wt.-% and 2 wt.-%, more preferably between 0.05 wt.-% and 1 wt.-% and most preferably between 0.1 wt.-% and 0.5 wt.-%, based on the dry weight of the calcium carbonate in the suspension of step a).

The step of contacting the aqueous suspension of dispersed calcium carbonate with the alkali carbonate(s) and/or alkali hydrogen carbonate(s) may be carried out immediately before, during and/or after diluting the aqueous suspension of dispersed calcium carbonate of step a). Thus, according to one embodiment of the inventive process, the aqueous suspension of dispersed calcium carbonate is first diluted and then contacted with the at least one alkali carbonate and/or alkali hydrogen carbonate. According to another embodiment of the inventive process, the aqueous suspension of dispersed calcium carbonate is simultaneously diluted and contacted with the at least one alkali carbonate and/or alkali hydrogen carbonate. According to a further embodiment of the inventive process, the aqueous suspension of dispersed calcium carbonate is first contacted with the at least one alkali carbonate and/or alkali hydrogen carbonate and then diluted, wherein the dilution should take place within a specific period of time after the contacting with the at least one alkali carbonate and/or alkali hydrogen carbonate. According to another embodiment of the inventive process, the aqueous suspension of dispersed calcium carbonate is diluted in one or more portions and the at least one alkali carbonate and/or alkali hydrogen carbonate is added in one or more portions.

According to another preferred embodiment of the invention, the aqueous suspension of dispersed calcium carbonate of step a) further comprises at least one dispersing agent, preferably a dispersing agent being selected from the group consisting of an organic dispersing agent, an inorganic dispersing agent and mixtures thereof. According to the present invention the organic dispersing agent comprises an acrylic polymer, a vinylic polymer, an acrylic and/or a vinylic copolymer and the inorganic dispersing agent comprises mono-, di- and/or trisodium orthophosphate, sodium tripolyphosphate and/or sodium polyphosphate. According to the present invention, the acid sites of the at least one organic dispersing agent are preferably partially or completely neutralized by sodium.

According to another preferred embodiment of the invention, the coating made from the diluted aqueous suspension of dispersed calcium carbonate obtained according to the present invention and especially according to the inventive process has a light scattering coefficient S of between 100 $m^2/kg$ to 250 $m^2/kg$, more preferably greater than 125 $m^2/kg$, and most preferably greater than 140 $m^2/kg$ for a coating weight of 20 $g/m^2$. According to one especially preferred embodiment of the invention, the coating made from the diluted aqueous suspension of dispersed calcium carbonate obtained according to the present invention and especially according to the inventive process has a light scattering coefficient S for a coating weight of 20 $g/m^2$ of at least 5 $m^2/kg$, more preferably at least 10 $m^2/kg$, even more preferably at least 15 $m^2/kg$, still more preferably at least 20 $m^2/kg$ above the light scattering coefficient S of a resulting coating of a corresponding aqueous suspension of dispersed calcium carbonate being treated the same way but in the absence of at least one alkali carbonate and/or alkali hydrogen carbonate.

As set out above, the inventive process for preparing an aqueous suspension of dispersed calcium carbonate providing improved optical properties comprises the steps a), b), c) and d). In the following, it is referred to further details of the present invention and especially the foregoing steps of the inventive process for preparing aqueous suspensions of dispersed calcium carbonate providing improved optical properties to coatings made therefrom.

Step a): Provision of an Aqueous Suspension of Dispersed Calcium Carbonate

According to step a) of the process of the present invention, an aqueous suspension of dispersed calcium carbonate is provided. The calcium carbonate ($CaCO_3$) particles of the suspension may be of two types: ground (or natural) calcium carbonate (GCC) or precipitated calcium carbonate (PCC) or mixtures of the foregoing.

GCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier. Preferably, the natural calcium carbonate is selected from the group comprising marble, chalk, calcite, dolomite, limestone and mixtures thereof.

By contrast, calcium carbonate of the PCC type include synthetic calcium carbonate products obtained by carbonation of a slurry of calcium hydroxide, commonly referred to in the art as a slurry of lime or milk of lime when derived from finely divided calcium oxide particles in water or by precipitation out of an ionic salt solution. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

The particulate calcium carbonate of the aqueous suspension of dispersed calcium carbonate provided in step a) may have a particle size distribution as conventionally employed for the material(s) involved in the type of product to be produced. In general, 90 wt.-% of the calcium carbonate particles may have an esd (equivalent spherical diameter as measured by the well known technique of sedimentation using a Sedigraph™ 5100 of Micromeritics Instrument Corporation) in the range of 0.1 µm to 5 µm, preferably in the range of 0.2 µm to 2 µm and most preferably in the range of 0.5 µm to 1.5 µm. In one preferred embodiment, 74 wt.-% of the calcium carbonate particles may have a particle esd of less than 1 µm and 12 wt.-% of the particles may have a particle esd of less than 0.2 µm. In another preferred embodiment, 60 wt.-% of the calcium carbonate particles may have a particle esd of less than 1 µm and 7 wt.-% of the particles may have a particle esd of less than 0.2 µm.

It is preferred that the calcium carbonate particles in the suspension have a median diameter $d_{50}$ value of from 0.005 µm to 2 µm, preferably from 0.2 µm to 1 µm and most preferably from 0.4 µm to 0.8 µm, for example 0.6 µm and 0.8 µm, as measured using a Sedigraph™ 5100 of Micromeritics Instrument Corporation. As used herein and as generally defined in the art, the $d_{50}$ value is defined as the size at which 50% (the median point) of the particle volume or mass is accounted for by particles having a diameter equal to the specified value. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

In a preferred embodiment, the calcium carbonate particles in the suspension exhibit a BET specific surface area of from 1 $m^2/g$ to 200 $m^2/g$, more preferably 3 $m^2/g$ to 25 $m^2/g$, most preferably 5 $m^2/g$ to 15 $m^2/g$ and even more preferably 6 $m^2/g$ to 12 $m^2/g$, measured using nitrogen and the BET method according to ISO 9277.

The calcium carbonate particles of the present invention are suspended in water and thus form an aqueous suspension or slurry.

Preferably, the aqueous suspension of dispersed calcium carbonate provided in step a) has a calcium carbonate content of between 35 wt.-% and 85 wt.-%, preferably between 65 wt.-% and 80 wt.-%, more preferably between 68 wt.-% and 78 wt.-%, and most preferably 70 wt.-% to 78 wt.-%, based on the total weight of the aqueous suspension of dispersed calcium carbonate. According to an especially preferred embodiment, the aqueous suspension of dispersed calcium carbonate provided in step a) is a concentrated suspension of dispersed calcium carbonate being especially suitable for transporting. The suspension should, on the one hand, be concentrated in order to allow for economically advantageous transporting and, on the other hand should be stable (no significant sedimentation). Preferably, the aqueous suspension of dispersed calcium carbonate has a solid content of calcium carbonate between 70 wt.-% and 78 wt.-%, based on the total weight of the aqueous suspension of dispersed calcium carbonate of step a). Thus, the aqueous suspension of dispersed calcium carbonate of step a) has preferably a water content of less than 35 wt.-% and more preferably less than 30 wt.-%, based on the total weight of the aqueous suspension of dispersed calcium carbonate provided in step a).

According to the present invention, the particulate calcium carbonate is dispersed in the aqueous suspension of step a) and, thus, the suspension further comprises a suitable dispersing agent.

Such dispersing agent is preferably at least one inorganic dispersing agent and/or organic dispersing agent. Preferably, such organic dispersing agent is made of monomers and/or co-monomers selected from the group consisting of acrylic acid, methacrylic acid, itaconic acid, crotonic acid, fumaric acid, maleic anhydride acid, the esters of acrylic and methacrylic acids and mixtures thereof. In one preferred embodiment, the at least one organic dispersing agent is selected from the group consisting of an acrylic polymer, a vinylic polymer, an acrylic and a vinylic copolymer and mixtures thereof. In another preferred embodiment, inorganic dispersing agents such as mono-, di- and/or trisodium orthophosphate, sodium tripolyphosphate and/or sodium polyphosphate, especially in combination with polyacrylic acid are used as dispersing agent.

Organic dispersing agents such as acrylic polymers, vinylic polymers, acrylic and vinylic copolymers or mixtures thereof having multiple acidic sites can be partially or totally neutralised. In one preferred embodiment, the organic dispersing agent which may be used according to the present invention is partially or completely neutralized, preferably to a degree of 5% to 100%, more preferably to a degree of 25% to 100% and most preferably to a degree of 75% to 100% using a neutralizing agent containing ions of alkali metals and/or alkaline earth metals. In an especially preferred embodiment, the acidic sites of the at least one organic dispersing agent are neutralized using a neutralizing agent containing only sodium. In another especially preferred embodiment, the acidic sites of the organic dispersing agent are neutralized using a neutralizing agent containing only potassium. In a further especially preferred embodiment, the acidic sites of the organic dispersing agent are neutralized using a neutralizing agent containing a mixture of sodium and potassium.

In another preferred embodiment, the acidic sites of the organic dispersing agent are partially or completely neutralized by ions of alkaline earth metals contained in the aqueous suspension of calcium carbonate, for example, by the in-situ reaction of the organic dispersing agent with particles in the suspension; i.e. the organic dispersing agent is added into said suspension in the form of the corresponding un-neutralized organic dispersing agent and partially or completely neutralized after its addition into the aqueous suspension of calcium carbonate. In this case, the acidic sites of the organic dispersing agent are partially or completely neutralized preferably to a degree of 5% to 100%, more preferably to a degree of 25% to 100% and most preferably to a degree of 75% to 100% by said ions of alkaline earth metals. In one preferred embodiment, the acidic sites of the organic dispersing agent are partially or completely neutralized by calcium ions and/or magnesium ions.

Such organic and/or inorganic dispersing agent may preferably have a molecular weight between 1 000 g/mol and 100 000 g/mol, preferably between 2 000 g/mol and 40 000 g/mol, more preferably between 3 000 g/mol and 35 000 g/mol. In particular, if the acidic sites of an organic dispersing agent are partially or completely neutralized by a neutralizing agent containing ions of alkali metals, such dispersing agent may have preferably a molecular weight between 1 000 g/mol and 100 000 g/mol, more preferably between 2 000 g/mol and 40 000 g/mol and most preferably between 3 000 g/mol and 35 000 g/mol. In case the acidic sites of the dispersing agent are partially or completely neutralized by a neutralizing agent containing ions of alkaline earth metals, such dispersing agent may preferably have a molecular weight between 3 000 g/mol and 20 000 g/mol.

The total amount of the dispersing agent in the suspension of dispersed calcium carbonate may be in the range between 0.05 wt.-% and 2.0 wt.-%, preferably between 0.1 wt.-% and 1.2 wt.-% and most preferably between 0.2 wt.-% and 0.8 wt.-%, based on the total weight of the aqueous suspension of dispersed calcium carbonate of step a).

In another preferred embodiment, the total amount of the dispersing agent in the suspension of dispersed calcium carbonate may be in the range between 0.075 wt.-% and 3.0 wt.-%, preferably between 0.15 wt.-% and 1.8 wt.-% and most preferably between 0.3 wt.-% and 1.2 wt.-%, based on the calcium carbonate content in the suspension.

The aqueous suspension of dispersed calcium carbonate of step a) is preferably obtained from a corresponding diluted aqueous suspension of calcium carbonate by concentrating said diluted suspension. The concentrating of the corresponding suspension of calcium carbonate may be achieved by means of a thermal process, for example in an evaporator, or by means of a mechanical process, for example in a filter press and/or centrifuge.

The dispersing agent is preferably added before or after the concentration of the corresponding suspension of calcium carbonate. The point in time for adding the dispersing agent may depend on the chosen process for concentrating the corresponding suspension of calcium carbonate; i.e. the addition of the dispersing agent may depend on whether a thermal or mechanical process is used.

In the case where the concentration of the suspension of calcium carbonate is carried out by means of a thermal process, the concentrating is preferably carried out in the presence of a dispersing agent, which is added to the suspension in order to keep the calcium carbonate particles finely dispersed in the suspension to obtain the aqueous suspension of dispersed calcium carbonate provided in step a).

In the case where the concentration of the suspension of calcium carbonate is carried out by means of a mechanical process, the concentrating is preferably carried out in the absence of a dispersing agent. The obtained filter cake of calcium carbonate is than preferably dispersed in water together with a dispersing agent in order to keep the calcium carbonate particles finely dispersed in the suspension to obtain the aqueous suspension of dispersed calcium carbonate provided in step a).

Additionally, the calcium carbonate particles may be further ground prior to the process for preparing an aqueous suspension of dispersed calcium carbonate of the present invention. Preferably, the grinding step is carried out prior to said concentration of the corresponding suspension to obtain the aqueous suspension of dispersed calcium carbonate of step a). The grinding of the calcium carbonate particles is preferably carried out in the absence or in the presence of a dispersing agent. In the case where the grinding step of the calcium carbonate particles is carried out in the absence of a dispersing agent, the corresponding suspension has preferably a solids content of less than 40 wt.-%, more preferably of less than 30 wt.-% and most preferably of less than 20 wt.-%, based on the total weight of the corresponding suspension of calcium carbonate. In the case where the grinding step of the calcium carbonate particles is carried out in the presence of a dispersing agent, the corresponding suspension has preferably a solids content of more than 30 wt.-%, more preferably of more than 60 wt.-% and most preferably of more than 70 wt.-%, for example 72 wt-% to 82 wt-% based on the total weight of the corresponding suspension of calcium carbonate. The grinding step can be carried out with any conventional grinding device such as a grinding mill known to the skilled person.

Typically, the aqueous suspensions of dispersed calcium carbonate according to the present invention have a pH value in the range of 7.5 to 12, preferably a pH value of 8 to 11, more preferably a pH value of 8.5 to 10.5 and most preferably a pH value of 9 to 10.5. The viscosity is preferably in the range between 50 mPa·s to 800 mPa·s and more preferably in the range between 150 mPa·s to 600 mPa·s, as measured with a Brookfield DV-II viscometer at a speed of 100 rpm and equipped with a LV-3 spindle after stirring for five minutes at 2 000 rpm by using a tooth disc stirrer having a diameter of 5 cm.

Step b): Provision of at Least One Alkali Carbonate and/or Alkali Hydrogen Carbonate According to step b) of the process of the present invention at least one alkali carbonate and/or alkali hydrogen carbonate is provided.

In a preferred embodiment of the present invention the alkali ion of the alkali carbonate and/or alkali hydrogen carbonate is preferably selected from the group comprising sodium, potassium and mixtures thereof. Sodium carbonate, potassium carbonate, sodium potassium carbonate, sodium hydrogen carbonate, potassium hydrogen carbonate and mixtures thereof are preferred alkali carbonates and/or alkali hydrogen carbonates of the present invention.

In one preferred embodiment, the alkali carbonate and/or alkali hydrogen carbonate is sodium carbonate. In another preferred embodiment, the alkali carbonate and/or alkali hydrogen carbonate is potassium carbonate. In a further preferred embodiment, the alkali carbonate and/or alkali hydrogen carbonate is a mixture of sodium carbonate and potassium carbonate.

If a mixture of sodium carbonate and potassium carbonate is used according to the present invention, the mole ratio of sodium carbonate and potassium carbonate is from 99:1 to 1:99, more preferably from 50:1 to 1:50, even more preferably from 25:1 to 1:25 and most preferably from 10:1 to 1:10. In one especially preferred embodiment of the present invention the mole ratio of sodium carbonate and potassium carbonate is about 1:1. In another preferred embodiment, the alkali carbonate and/or alkali hydrogen carbonate is sodium potassium carbonate ($Na_2K_2(CO_3)_2$).

If a mixture of alkali carbonate and alkali hydrogen carbonate is used according to the present invention, the mole ratio of alkali carbonate and alkali hydrogen carbonate is from 99:1 to 1:99, more preferably from 50:1 to 1:50, even more preferably from 25:1 to 1:25 and most preferably from 10:1 to 1:10. In one especially preferred embodiment of the present invention the mole ratio of alkali carbonate and alkali hydrogen carbonate is about 1:1.

In the context of the present invention, the term "sodium carbonate" shall include sodium carbonate in the anhydrous form as well as forms comprising crystal water (hydrate). Thus, the term "sodium carbonate" comprises anhydrous sodium carbonate ($Na_2CO_3$), sodium carbonate monohydrate ($Na_2CO_3.H_2O$), sodium carbonate dihydrate ($Na_2CO_3.2H_2O$), sodium carbonate pentahydrate ($Na_2CO_3.5H_2O$), sodium carbonate heptahydrate ($Na_2CO_3.7H_2O$), sodium carbonate decahydrate ($Na_2CO_3.10H_2O$) and trisodium hydrogen dicarbonate dihydrate ($Na_3HCO_3CO_3.2H_2O$), sodium sesquicarbonate ($Na_3H(CO_3)_2$), and bicarbonate salts such as sodium bicarbonate and mixtures thereof. Preferably, the sodium carbonate of the present invention is selected from the group consisting of anhydrous sodium carbonate ($Na_2CO_3$), sodium carbonate monohydrate ($Na_2CO_3.H_2O$), sodium carbonate heptahydrate ($Na_2CO_3.7H_2O$), sodium carbonate decahydrate ($Na_2CO_3.10H_2O$) and mixtures thereof. In one especially preferred embodiment, the sodium carbonate of the present invention is anhydrous sodium carbonate ($Na_2CO_3$) or sodium carbonate decahydrate ($Na_2CO_3.10H_2O$).

The term "potassium carbonate" also refers to potassium carbonate in the anhydrous form as well as forms comprising crystal water (hydrate). Thus, the term "potassium carbonate" includes anhydrous potassium carbonate ($K_2CO_3$), potassium carbonate sesquihydrate ($K_2CO_3.1.5H_2O$), potassium carbonate dihydrate ($K_2CO_3.2H_2O$), potassium carbonate trihydrate ($2K_2CO_3.3H_2O$), potassium carbonate hexahydrate ($K_2CO_3.6H_2O$), potassium carbonate octahydrate ($K_2CO_3.8H_2O$), potassium carbonate decahydrate ($K_2CO_3.10H_2O$) and bicarbonate salts such as potassium bicarbonate and mixtures thereof. Preferably, the potassium carbonate of the present invention is anhydrous potassium carbonate ($K_2CO_3$).

In the context of the present invention, the term "sodium hydrogen carbonate" shall include sodium hydrogen carbonate in the anhydrous form as well as forms comprising crystal water (hydrate). Thus, the term "sodium hydrogen carbonate" includes anhydrous sodium hydrogen carbonate ($NaHCO_3$) and sodium hydrogen carbonate monohydrate ($Na_3H(CO_3)_2.H_2O$), sodium hydrogen carbonate dihydrate ($Na_3H(CO_3)_2.H_2O$) and mixtures thereof. Preferably, the sodium hydrogen carbonate of the present invention is anhydrous sodium hydrogen carbonate ($NaHCO_3$).

In the context of the present invention, the term "potassium hydrogen carbonate" shall also include potassium hydrogen carbonate in the anhydrous form as well as forms comprising crystal water (hydrate). Preferably, the potassium hydrogen of the present invention is anhydrous potassium hydrogen carbonate ($KHCO_3$).

If the at least one alkali carbonate and/or alkali hydrogen carbonate is contacted with said aqueous suspension of dispersed calcium carbonate, the at least one alkali carbonate and/or alkali hydrogen carbonate dissociates into the corresponding individual ionic groups, namely into cationic groups such as sodium ions and/or potassium ions and/or hydronium ions and anionic groups of carbonate and/or hydrogen carbonate.

The alkali carbonate and/or alkali hydrogen carbonate of the present invention is preferably added in a quantity so that it is contained in the resulting suspension of dispersed calcium carbonate in a concentration of between 0.001 wt.-% and 5 wt.-%, preferably between 0.025 wt.-% and 2 wt.-%, more preferably between 0.05 wt.-% and 1 wt.-% and most preferably between 0.1 wt.-% and 0.5 wt.-%, based on the dry weight of the calcium carbonate in the suspension of step a).

In another preferred embodiment, the alkali carbonate and/or alkali hydrogen carbonate is added in the range of about 0.00075 wt.-% to 7.5 wt.-%, more preferably in the range of about 0.0075 wt.-% to 3.75 wt.-%, even more preferably in the range of about 0.075 wt.-% to 2.0 wt.-% and most preferably in the range of about 0.2 wt.-% to 1.25 wt.-%, based on the total weight of the aqueous suspension of dispersed calcium carbonate.

It is to be noted that mole ratios, weight ratios and quantities of alkali carbonate and/or alkali hydrogen carbonate in the meaning of the present invention refer to the alkali carbonate and/or alkali hydrogen carbonate, respectively, in the anhydrous form; i.e. the alkali carbonate and/or alkali hydrogen carbonate without additional crystal water. Additionally, aforementioned ratios and quantities reflect the ratios and quantities of alkali carbonate and/or alkali hydrogen carbonate being added to the aqueous suspension of dispersed calcium carbonate and do not consider a conversion of parts of said alkali carbonate into the corresponding alkali hydrogen carbonate and vice versa. In this context, it is further to be noted that said conversion naturally occurs in the aqueous suspension of dispersed calcium carbonate depending on the pH value of said suspension.

With respect to the pH value, it is further to be noted that the pH value of the aqueous suspension of dispersed calcium carbonate may change by contacting said suspension with the at least one alkali carbonate and/or alkali hydrogen carbonate. In case such a change in the pH value is observed, the pH value of the aqueous suspension of dispersed calcium carbonate after contacting said suspension with the at least one alkali carbonate and/or alkali hydrogen carbonate should be at most 4 units (1 unit=1.0), preferably at most 3 units, more preferably at most 2 units, even more preferably at most 1 unit and most preferably at most 0.5 units above the pH value as measured for the aqueous suspension of dispersed calcium carbonate provided in step a). However, even if a change in the pH value is observed, the resulting aqueous suspension of dispersed calcium carbonate has a pH value in the range of 7.5 to 12, preferably a pH value of 8 to 11, more preferably a pH value of 8.5 to 10.5 and most preferably a pH value of 9 to 10.5 after contacting said suspension with the at least one alkali carbonate and/or alkali hydrogen carbonate.

The at least one alkali carbonate and/or alkali hydrogen carbonate can be added to the aqueous suspension of dispersed calcium carbonate in any appropriate solid form, e.g. in the form of granules or a powder. Alternatively, the at least one alkali carbonate and/or alkali hydrogen carbonate can be added to the aqueous suspension of dispersed calcium carbonate in the form of a suspension or solution.

Preferably, the concentration of the at least one alkali carbonate and/or alkali hydrogen carbonate in the aqueous suspension of dispersed calcium carbonate is such that the weight ratio calcium carbonate:alkali carbonate and/or alkali hydrogen carbonate is from 250:1 to 10:1, more preferably 200:1 to 25:1, and even more preferably 175:1 to 60:1. If the at least one alkali carbonate and/or alkali hydrogen carbonate is sodium carbonate, the concentration in the calcium carbonate suspension preferably is such that the weight ratio calcium carbonate:sodium carbonate is from 200:1 to 10:1, more preferably 150:1 to 25:1, and even more preferably 100:1 to 50:1.

If the at least one alkali carbonate and/or alkali hydrogen carbonate is potassium carbonate, the concentration in the calcium carbonate suspension is preferably such that the weight ratio calcium carbonate:potassium carbonate is from 250:1 to 50:1, more preferably 200:1 to 100:1, and even more preferably 175:1 to 120:1.

It is to be noted that the aforementioned figures reflect the amount of alkali carbonate and/or alkali hydrogen carbonate being added to an aqueous suspension of dispersed calcium carbonate in order to improve the optical properties and especially the opacity of a coating made from the diluted suspension of dispersed calcium carbonate in comparison to a corresponding coating of a suspension of dispersed calcium carbonate not being treated according to the present invention. Thus, the figures are not intended to cover any alkali carbonate(s) and/or alkali hydrogen carbonate(s) which may naturally be present in the aqueous suspension or which may have been added before carrying out the inventive process and especially the dilution step. The amount of dissolved naturally occurring alkali carbonate and/or alkali hydrogen carbonate in a suspension of calcium carbonate usually is negligible and well below 100 ppm, based on the calcium carbonate content of the suspension.

Step c): Diluting the Aqueous Suspension of Dispersed Calcium Carbonate of Step a);

According to step c) of the process of the present invention, the aqueous suspension of dispersed calcium carbonate provided in step a) is diluted with water.

In one embodiment of the present invention, the aqueous suspension of dispersed calcium carbonate of step a) is diluted with water to yield a suspension of dispersed calcium carbonate having a solid content, which allows the handling (e.g. pumping) and the use or application of the suspension of dispersed calcium carbonate. In other words, the diluting step c) may serve to transform the concentrated (transportable) suspension of dispersed calcium carbonate into a diluted suspension of dispersed calcium carbonate which is ready for further use or handling. Preferably, the aqueous suspension of dispersed calcium carbonate of step a) is diluted to yield a content of calcium carbonate of at most 70 wt.-% preferably between 30 wt.-% and 70 wt.-%, more preferably between 50 wt.-% and 68 wt.-% and most preferably between 55 wt.-% to 65 wt.-%, based on the total weight of the aqueous suspension of dispersed calcium carbonate.

In a preferred embodiment, the water content of the diluted suspension of dispersed calcium carbonate is between 1 wt.-% and 25 wt.-%, more preferably between 5 wt.-% and 15 wt.-% and most preferably between 8 wt.-% and 13 wt.-% above the water content of the aqueous suspension of dispersed calcium carbonate provided in step a), wherein the foregoing wt.-% figures are based on the water content of the aqueous suspension of dispersed calcium carbonate provided in step a).

The water to be used for diluting the aqueous suspension of dispersed calcium carbonate of step a) may be tap water and/or deionised water. Preferably, the water used for diluting the aqueous suspension of dispersed calcium carbonate of step a) is deionised water.

In one preferred embodiment of the present invention, the aqueous suspension of dispersed calcium carbonate provided in step a) is diluted in one portion and/or continuously over a period of 1 h or less, preferably over a period of 45 min or less, more preferably over a period of 30 min or less and most preferably over a period of 15 min or less to a suitable calcium carbonate concentration in the suspension. In an especially preferred embodiment the aqueous suspension of dispersed calcium carbonate provided in step a) is diluted over a period of 10 min or less to a suitable calcium carbonate concentration in the suspension. In another preferred embodiment of the present invention, the aqueous suspension of dispersed calcium carbonate provided in step a) is diluted in several portions to a suitable calcium carbonate concentration in the suspension, preferably in two to five portions, more preferably in two to four portions, even more preferably in two to three portions and most preferably in two portions.

In case the aqueous suspension of dispersed calcium carbonate provided in step a) is diluted in several portions, water is preferably added in about equal portions to the aqueous suspension of dispersed calcium carbonate. As an alternative, it is also possible to add water in unequal portions to the aqueous suspension of dispersed calcium carbonate, i.e. in larger and smaller portions, wherein in case of adding two portions the weight ratio of the larger portion to the smaller portion is preferably 60:40, more preferably 70:30, even more preferably 80:20 and most preferably 90:10. In one preferred embodiment, the larger portion is added first followed by the addition of the smaller portion of water to the aqueous suspension of dispersed calcium carbonate in order to dilute the aqueous suspension of dispersed calcium carbonate provided in step a). In another preferred embodiment, the smaller portion of water is added first followed by the addition of the larger portion to the aqueous suspension of dispersed calcium carbonate in order to dilute the aqueous suspension of dispersed calcium carbonate provided in step a).

It is especially preferred to dilute the aqueous suspension of dispersed calcium carbonate during stirring, preferably by using a rotor-stator mixer.

Step d): Contacting the Suspension of Dispersed Calcium Carbonate with Said at Least One Alkali Carbonate and/or Alkali Hydrogen Carbonate According to step d) of the process of the present invention, the aqueous suspension of dispersed calcium carbonate provided in step a) is contacted with said at least one alkali carbonate and/or alkali hydrogen carbonate of step b) in an aqueous environment before and/or during and/or after step c). Said aqueous suspension of dispersed calcium carbonate is preferably processed with step d) via one or more of the following routes:

Route IA: simultaneously contacting said aqueous suspension of dispersed calcium carbonate with said at least one alkali carbonate and/or alkali hydrogen carbonate of step b) and diluting the aqueous suspension of dispersed calcium carbonate of step a);

Route IIA: first diluting said aqueous suspension of dispersed calcium carbonate of step a) and then contacting the diluted suspension of dispersed calcium carbonate with said at least one alkali carbonate and/or alkali hydrogen carbonate of step b);

Route IIIA: first contacting said aqueous suspension of dispersed calcium carbonate with said at least one alkali carbonate and/or alkali hydrogen carbonate of step b) and then diluting said suspension of dispersed calcium carbonate of step a).

In the case where the aqueous suspension of dispersed calcium carbonate of step a) is simultaneously diluted and contacted with the at least one alkali carbonate and/or alkali hydrogen carbonate (Route IA), said alkali carbonate and/or alkali hydrogen carbonate prior to the addition is preferably blended or mixed in a portion or the complete amount of water required or used for diluting the suspension of dispersed calcium carbonate. Consequently, an alkali carbonate and/or alkali hydrogen suspension or solution may be added to the aqueous suspension of dispersed calcium carbonate in step d).

The alkali carbonate and/or alkali hydrogen carbonate suspension or solution is added to the aqueous suspension of dispersed calcium carbonate in one portion and/or continuously over a period of 1 h or less, preferably over a period of 45 min or less, more preferably over a period of 30 min or less and most preferably over a period of 15 min or less and in an especially preferred embodiment over a period of 10 min or less. In another preferred embodiment, the mixture of water and alkali carbonate and/or alkali hydrogen carbonate is added to the aqueous suspension of dispersed calcium carbonate in several portions, for example, in two portions of equal amounts. If the aqueous suspension of dispersed calcium carbonate is diluted in several portions, it is also possible to blend or mix the at least one alkali carbonate and/or alkali hydrogen carbonate in only a portion of water for diluting the aqueous suspension of dispersed calcium carbonate prior to the addition and then adding said portion containing the at least one alkali carbonate and/or alkali hydrogen carbonate to the aqueous suspension of dispersed calcium carbonate. After complete addition of said portion, the at least one further portion of water may be added to the aqueous suspension of dispersed calcium carbonate.

In the case where the aqueous suspension of dispersed calcium carbonate of step a) is diluted before contacting said aqueous suspension of dispersed calcium carbonate with the at least one alkali carbonate and/or alkali hydrogen carbonate of step b) via Route IIA, the alkali carbonate and/or alkali hydrogen carbonate may, for example, be added to the diluted aqueous suspension of dispersed calcium carbonate in one portion and/or continuously over a period of 15 min or less, preferably over a period of 10 min or less, more preferably over a period of 5 min or less. Again, an alkali carbonate and/or alkali hydrogen carbonate suspension or solution may be used for adding the alkali carbonate and/or alkali hydrogen carbonate. Alternatively, the alkali carbonate and/or alkali hydrogen carbonate may be added in solid form, e.g. as a powder.

The aqueous suspension of dispersed calcium carbonate of step a) is preferably contacted with the at least one alkali carbonate and/or alkali hydrogen carbonate of step b) within three days after diluting the aqueous suspension of dispersed calcium carbonate, more preferably within two days and most preferably within 24 hours. In particular, the aqueous suspension of dispersed calcium carbonate is contacted within 12 hours after diluting the aqueous suspension of dispersed calcium carbonate, preferably within 6 hours, more preferably within 4 hours, even more preferably within 2 hours and most preferably within 1 hour.

If the aqueous suspension of dispersed calcium carbonate is diluted in several portions, it is also possible to blend or mix the at least one alkali carbonate and/or alkali hydrogen carbonate in a portion of water for diluting the aqueous suspension of dispersed calcium carbonate prior to the addition. After the addition of at least one portion of water, which does not contain any additional alkali carbonate and/or alkali hydrogen carbonate, the portion containing the at least one alkali carbonate and/or alkali hydrogen carbonate may be added to the aqueous suspension of dispersed calcium carbonate or vice versa.

In the case where the aqueous suspension of dispersed calcium carbonate of step a) is diluted after contacting the at least one alkali carbonate and/or alkali hydrogen carbonate of step b) with the aqueous suspension of dispersed calcium carbonate to be contacted via Route IIIA, the at least one alkali carbonate and/or alkali hydrogen carbonate may, for example, be added in one portion and/or continuously over a period of 20 min or less, preferably over a period of 15 min or less, more preferably over a period of 10 min or less and most preferably over a period of 5 min or less and in an especially preferred embodiment in one portion. According to this embodiment of the invention, the dilution (step c)) should be carried out immediately after the complete addition of the at least one alkali carbonate and/or alkali hydrogen carbonate. The term "immediately" in the meaning of the present invention relates to a period of time of less than 45 min after the complete addition of the at least one alkali carbonate and/or alkali hydrogen carbonate of step b), preferably less than 30 min, more preferably less than 15 min, even more preferably less than 10 min and most preferably less than 5 min.

In the case where said aqueous suspension of dispersed calcium carbonate is processed via more than one of the afore-mentioned routes, the aqueous suspension of dispersed calcium carbonate of step a) is preferably contacted with the at least one alkali carbonate and/or alkali hydrogen carbonate of step b) before, during and after diluting the aqueous suspension of dispersed calcium carbonate of step a).

The alkali carbonate and/or alkali hydrogen carbonate may, for example, be added to the suspension of dispersed calcium carbonate of step a) in several portions and/or continuously over a period of 15 min or less, preferably over a period of 10 min or less, more preferably over a period of 5 min or less. During said continuous addition of the at least one alkali carbonate and/or alkali hydrogen carbonate, the aqueous suspension of dispersed calcium carbonate of step a) is preferably diluted in one portion and/or continuously over a period of time, wherein said period of time is shorter than the period of time required for adding the at least one alkali carbonate and/or alkali hydrogen carbonate. Thus, the aqueous suspension of dispersed calcium carbonate of step a) is diluted during contacting the aqueous suspension of dispersed calcium carbonate with the at least one alkali carbonate and/or alkali hydrogen carbonate but said contacting is finished before its addition is completed. Again, an alkali carbonate and/or alkali hydrogen carbonate suspension or solution may be used for adding the alkali carbonate and/or alkali hydrogen carbonate.

Alternatively, the alkali carbonate and/or alkali hydrogen carbonate may be added in solid form, e.g. as a powder.

If the at least one alkali carbonate and/or alkali hydrogen carbonate is added to the suspension of dispersed calcium carbonate of step a) in several portions, the at least one alkali carbonate and/or alkali hydrogen carbonate is preferably added in at least three portions of equal and/or unequal amounts. In this embodiment of the present invention, at least one portion of the at least one alkali carbonate and/or alkali hydrogen carbonate is added to the aqueous suspension of dispersed calcium carbonate of step a) before said aqueous suspension is diluted, at least one portion of the at least one alkali carbonate and/or alkali hydrogen carbonate is added to the aqueous suspension of dispersed calcium carbonate of step a) during said aqueous suspension is diluted and at least one portion of the at least one alkali carbonate and/or alkali hydrogen carbonate is added to the aqueous suspension of dispersed calcium carbonate of step a) after said aqueous suspension has been diluted. According to this embodiment, the dilution (step c)) should be carried out within a period of time of less than 45 min after the addition of the first portion of the at least one alkali carbonate and/or alkali hydrogen carbonate of step b), preferably less than 30 min, more preferably less than 15 min, even more preferably less than 10 min and most preferably less than 5 min. Preferably, the alkali carbonate and/or alkali hydrogen carbonate may be added in solid form, e.g. as a powder, or alternatively, in the form of a suspension or solution. In one embodiment, at least one portion of the at least one alkali carbonate and/or alkali hydrogen carbonate may be dissolved in water used for diluting the aqueous suspension of dispersed calcium carbonate provided in step a).

In one preferred embodiment, step d) is preferably carried out at temperatures below 70° C., more preferably of below 50° C. and most preferably of below 30° C. However, step d) is preferably carried out at temperatures of above 10° C. and more preferably of above 15° C. In particular, step d) is carried out at room temperature, preferably between 18° C. and 25° C. In another preferred embodiment of the present invention, step d) is carried out at temperatures between 50° C. and 70° C., more preferably between 55° C. and 65° C.

In a further preferred embodiment, step d) is carried out under continuously stirring in order to contact the suspension of dispersed calcium carbonate of step a) with the at least one alkali carbonate and/or alkali hydrogen carbonate of step b) in an aqueous environment.

After step d) has been carried out, the aqueous suspension of dispersed calcium carbonate thus obtained is preferably stored at temperatures between 5° C. and 90° C., more preferably between 10° C. and 60° C. and most preferably of about room temperature, for example, between 18° C. and 25° C.

In case step d) is carried out at temperatures between 50° C. and 70° C., the aqueous suspension of dispersed calcium carbonate thus obtained is preferably slowly cooled down to room temperature of about 18° C. to 25° C. In particular, the aqueous suspension of dispersed calcium carbonate is cooled down to room temperature over a period of several weeks, preferably over a period of two to four weeks and most preferably over a period of about three weeks. The cooling down of the obtained aqueous suspension of dispersed calcium carbonate is preferably carried out with a constant rate of 1° C. to 3° C. per day to room temperature. In one preferred embodiment, the cooling down of the obtained aqueous suspension of dispersed calcium carbonate is carried out with a constant rate of 1.5° C. to 2° C. per day to room temperature.

The coatings made from diluted aqueous suspensions of dispersed calcium carbonate obtained from concentrated aqueous suspensions of dispersed calcium carbonate by the process of the present invention are highly opaque and, thus, allow for easy and economic transporting of concentrated aqueous suspensions of dispersed calcium carbonate. The resulting coatings of the aqueous suspensions of dispersed calcium carbonate obtained according to the present invention, have improved optical properties in comparison to corresponding coatings prepared from suspensions being diluted in a conventional way, i.e. only with water in the absence of alkali carbonates and/or alkali hydrogen carbonates. The coatings made from the inventive aqueous suspensions of dispersed calcium carbonate provide a light scattering coefficient S that is higher compared to the corresponding coating of an aqueous suspension of dispersed calcium carbonate obtained by simply diluting with water. Said light scattering coefficient S and all light scattering coefficients S relating to the present invention are determined in accordance with the measurement method defined herein and shown in the example section here below.

In a preferred embodiment, the coating made from the obtained aqueous suspension of dispersed calcium carbonate has a light scattering coefficient S of between 100 $m^2/kg$ and 250 $m^2/kg$, more preferably greater than 125 $m^2/kg$, and most preferably greater than 140 $m^2/kg$ for a coating weight of 20 $g/m^2$.

In one preferred embodiment, the light scattering coefficient S of the coating made from the obtained aqueous suspension of dispersed calcium carbonate is at least 5 $m^2/kg$, more preferably at least 10 $m^2/kg$, even more preferably at least 15 $m^2/kg$, still more preferably at least 20 $m^2/kg$ above the light scattering coefficient S of a resulting coating of a corresponding aqueous suspension of dispersed calcium carbonate being treated the same way but without carrying out step d) for a coating weight of 20 $g/m^2$.

Preferably, the light scattering coefficient S of the obtained aqueous suspension of dispersed calcium carbonate is adjusted (i.e. the final or a stable value is obtained) within a couple of hours or weeks, preferably within 4 weeks, more preferably within 1 week and most preferably within 24 hours after the aqueous suspension of dispersed calcium carbonate has been processed according to step d).

It is especially preferred that the aqueous suspensions of dispersed calcium carbonate obtained by the process of the present invention have a pH value in the range of 7.5 to 12, preferably a pH value of 8 to 11, more preferably a pH value of 8.5 to 10.5 and most preferably a pH value of 9 to 10.5. The viscosity is preferably in the range between 50 mPa·s to 800 mPa·s and more preferably in the range between 150 mPa·s to 600 mPa·s, as measured with a Brookfield DV-II viscometer at a speed of 100 rpm and equipped with a LV-3 spindle after stirring for five minutes at 2 000 rpm by using a tooth disc stirrer having a diameter of 5 cm. In one preferred embodiment, the viscosity of the aqueous suspension of dispersed calcium carbonate obtained by the process of the present invention is about the same as measured for the aqueous suspension of dispersed calcium carbonate provided in step a); i.e. the viscosity of the aqueous suspension of dispersed calcium carbonate provided in step a).

The at least one alkali carbonate and/or alkali hydrogen carbonate of step b) may be preferably offered in the form of a separately metered additive (e.g. in the form of singular batches or portions) so that the concentration ratio may be individually adjusted depending on the present opacity problem.

The aqueous suspensions of dispersed calcium carbonate thus obtained may be used in paper, tissue paper, plastics or paints. In particular, said aqueous suspensions can be used in the field of the mass filling and/or coating of paper. In particular, coating compositions and/or mass filler compositions according to the invention are characterized in that they contain aqueous suspensions of dispersed calcium carbonate obtained by the process of the present invention and in that they have an ability to scatter visible light measured by the value of the light scattering coefficient S of between 100 $m^2$/kg and 250 $m^2$/kg, more preferably greater than 125 $m^2$/kg and most preferably greater than 140 $m^2$/kg for a coating weight of 20 g/$m^2$. Papers manufactured and/or coated are characterized in that they contain said aqueous suspensions of dispersed calcium carbonate obtained by the process of the present invention. As another advantage, the aqueous suspensions of dispersed calcium carbonate obtained by the process of the present invention can be used directly in a paper making application without the removal of, for example, iron salts or colored compounds.

The following examples may additionally illustrate the invention, but are not meant to restrict the invention to the exemplified embodiments. The examples below show the good optical properties such as opacity of the resulting coatings of the aqueous suspensions of dispersed calcium carbonate according to the present invention:

EXAMPLES

Measurement Methods

The following measurement methods are used to evaluate the parameters given in the examples and claims.

Light Scattering Coefficient

The light scattering coefficient "S" was measured by preparing a paper coating colour using 12 parts (on dry basis) of Acronal™ S 360 D, BASF, a paper coating binder and 88 parts (on dry basis) of the calcium carbonate suspension and coated on a plastic support (Synteape, Argo Wiggins) at a range of different coat weight using a laboratory coater Typ Model 624 from Ericksen, 58675 Hemer, Germany.

The light scattering coefficient S is measured according to the method described in US 2004/0250970, wherein the ability to scatter light is expressed by the Kubelka-Munk light scattering coefficient, determined by the method, well-known to experts, described in the publications of Kubelka and Munk (Zeitschrift für Technische Physik 12, 539, (1931)), and of Kubelka (J. Optical Soc. Am. 38(5), 448, (1948) and J. Optical Soc. Am. 44(4), 330, (1954)). The light scattering coefficient S is quoted as the value interpolated at 20 g/$m^2$.

Brookfield Viscosity

The Brookfield-viscosity of a suspension was determined with a Brookfield viscometer type RVT equipped with a LV-3 spindle at a speed of 100 rpm and room temperature (20±3° C.) after stirring for five minutes at 2 000 rpm by using a tooth disc stirrer having a diameter of 5 cm.

Molecular Weight of a Material

All weight average molecular weights (Mw), number average molecular weights (Mn) and corresponding polydispersities of polymers are measured as 100 mol-% sodium salt at pH 8 according to an aqueous Gel Permeation Chromatography (GPC) method calibrated with a series of five sodium polyacrylate standards supplied by Polymer Standard Service with references PSS-PAA 18K, PSS-PAA 8K, PSS-PAA 5K, PSS-PAA 4K and PSS-PAA 3K.

BET Specific Surface Area of a Material

The BET specific surface area is measured via the BET method according to ISO 9277 using nitrogen, following conditioning of the sample by heating at 250° C. for a period of 30 minutes. Prior to such measurements, the sample is filtered, rinsed and dried at 110° C. in an oven for at least 12 hours.

Particle Size Distribution (Mass % Particles with a Diameter <X) and Weight Median Diameter ($d_{50}$) of a Particulate Material Weight median grain diameter and grain diameter mass distribution of a particulate material are determined via the sedimentation method, i.e. an analysis of sedimentation behavior in a gravitational field. The measurement is made with a Sedigraph™ 5120.

The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and ultrasonic.

pH of an Aqueous Suspension

The pH of the aqueous suspension is measured using a standard pH-meter at approximately 22° C.

Solids Content of an Aqueous Suspension

The suspension solids content (also known as "dry weight") is determined using a Moisture Analyser HR73 commercialised by Mettler-Toledo, Switzerland with the following settings: temperature of 120° C., automatic switch off 3, standard drying, 5-20 g of suspension.

Polyelectrolyte Titration (PET) Procedure

The polyelectrolyte content in the aqueous suspension is determined using a Memotitrator Mettler DL 55 equipped with a Phototrode DP 660 commercialised by Mettler-Toledo, Switzerland. The measurements of the poyelectrolyte content was carried out by weighing a sample of the calcium carbonate suspension into a titration vessel and diluting said sample with deionized water up to a volume of approximately 40 ml. Subsequently, 10 ml of 0.01M cationic poly(N,N-dimethyl-3,5-dimethylene-piperidinium chloride) (PDDPC; obtained from ACROS Organics, Belgium) are slowly added under stirring into the titration vessel within 5 min. and than the content of the vessel is stirred for another 20 min. Afterwards the suspension is filtered trough a 0.2 μm mix-ester membrane filter (Ø 47 mm) and washed with 5 ml of deionized water. The thus obtained filtrate is diluted with 5 ml of phosphate buffer pH 7 (Riedel-de Haën, Germany) and than 0.01M of a potassium polyvinylsulfate (KPVS; obtained from SERVA Feinbiochemica, Heidelberg) solution is added slowly to the filtrate to titrate the excess of cationic reagent. The endpoint of titration is detected by a Phototrode DP660, which is adjusted to 1200 to 1400 mV in deionized water, prior to such measurement. The charge calculation is carried out according to the following evaluation:

$$Q_{atro} = \frac{((V_{PDDPC} * t_{PDA}) - V_{KPVS}) * (-1000)}{E_P * Fk} [\mu Val/g]$$

$$w_{atro} = -\frac{Q_{atro}}{K_{DM} * 100} [\%]$$

Calculation of the optimal sample weight: $E_P = \frac{60}{w_{DM} * K_{DM} * Fk}$ Calculation of adapted sample weight for 4 ml consumption $$E_{4ml} = \frac{E_1 * 6}{(10 - V_{KPVS,1})}$$

Abbreviations
$E_P$=sample weight [g]
$w_{DM}$=Dispersing agent content in [%]
$K_{DM}$=Dispersing agent constant [μVal/0.1 mg dispersing agent]
Fk=Solids content [%]
$V_{PDDPC}$=Volume PDDPC [ml]
$V_{KPVS}$=Volume KPVS [ml]
$t_{PDDPC}$=Titer PDDPC
$E_{DM}$=Dispersing agent weight [mg]
Q=Charge [μVal/g]
$w_{atro}$=Dispersing agent content atro [%]
$E_1$=Sample weight of experiment to be optimised [g]
$V_{KPVS,1}$=experimental consumption KPVS [ml] of experiment to be optimised Example 1

The following illustrative examples of the invention involve the preparation of natural ground calcium carbonate of Norwegian origin having a $d_{50}$ of 0.8 μm by contacting the aqueous suspension of dispersed calcium carbonate with sodium carbonate and diluting said suspension in comparison to diluting the same aqueous suspension of dispersed calcium carbonate without adding any alkali carbonate and/or alkali hydrogen carbonate (prior art).
Aqueous Suspension of Calcium Carbonate 1A Norwegian marble rocks of the region of Molde, Norway having a diameter of 10-300 mm are autogenously dry ground (i.e. in absence of grinding media) to a fineness of a $d_{50}$ in the range of 42-48 μm.

This mineral is wet ground at 10-15 wt.-% solid content in tap water in a vertical attritor mill (Dynomill) in a recirculation mode without adding additives, such as dispersing and/or grinding aids to a fineness until 74 wt.-% of the particle having a diameter <1 μm and 12 wt.-% of the particle having a diameter <0.2 μm. After grinding the product has a median diameter $d_{50}$ of 0.61 μm and a specific surface area of 10.2 m$^2$/g.

The obtained mineral is further thermally up-concentrated in an evaporator to a final calcium carbonate content of 75 wt.-% and further using 0.45 wt.-% sodium polyacrylate (Mw 6 000) and 0.25 wt.-% sodium hydrogen phosphate as dispersing agent.

During the thermal concentration samples were taken and the light scattering coefficient S of these samples are measured.

The following Table 1 shows the properties of the samples taken from said aqueous suspension of dispersed calcium carbonate and the corresponding calcium carbonate content of the suspension and coating colour and its light scattering coefficients:

| Sample | Suspension solids content in wt.-% | Coating colour solids content in wt.-% | S at 20 g/m$^2$ coat weight in m$^2$/kg | Polyelectrolyte in water in μVal/ml |
|---|---|---|---|---|
| 1 | 10.0 | 7 | 225.0 | |
| 2 | 55.4 | 54 | 199.5 | |
| 3 | 65.2 | 60 | 194.3 | |
| 4 | 69.1 | 60 | 177.4 | |
| 5 | 72.3 | 60 | 167.0 | −35 |
| 6 | 73.8 | 60 | 140.5 | |
| 7 | 75.5 | 60 | 125.8 | |

The coating colour is prepared from the corresponding aqueous suspension of dispersed calcium carbonate and further comprises binding agents as outlined in the above-described measurement methods.
Aqueous Suspension of Calcium Carbonate 1B (Prior Art)

The suspension of Sample 5 was diluted using distilled water back to 62.0 wt.-% calcium carbonate content and stored. After three weeks the light scattering coefficient S was determined. The following Table 2 shows the properties of the aqueous suspension of dispersed calcium carbonate and the corresponding calcium carbonate content of the suspension and coating colour and its light scattering coefficient:

| Suspension solids content in wt.-% | Coating colour solids content in wt.-% | S at 20 g/m$^2$ coat weight in m$^2$/kg | polyelectrolyte in water in μVal/ml |
|---|---|---|---|
| 62 | 60 | 167.0 | −21 |

Aqueous Suspension of Calcium Carbonate 1C (Invention)

The suspension of sample 5 was diluted to a calcium carbonate content of 62 wt.-% by using distilled water. Then 1.0 wt.-% of sodium carbonate with respect to the calcium carbonate content in the suspension was added and stored. After three weeks the S value was determined. The following Table 3 shows the properties of the aqueous suspension of dispersed calcium carbonate and the corresponding calcium carbonate content of the suspension and coating colour and its light scattering coefficient:

| Suspension solids content in wt.-% | Coating colour solids content in wt.-% | S at 20 g/m$^2$ coat weight in m$^2$/kg | Polyelectrolyte in water in μVal/ml |
|---|---|---|---|
| 62 | 60 | 178.0 | −54 |

Example 2

The following illustrative examples of the invention involve the preparation of natural ground calcium carbonate of Norwegian origin having a $d_{50}$ of 0.8 μm by contacting the aqueous suspension of dispersed calcium carbonate with potassium carbonate and diluting said suspension in comparison to diluting the same aqueous suspension of dispersed calcium carbonate without adding any alkali carbonate and/or alkali hydrogen carbonate (prior art).
Aqueous Suspension of Calcium Carbonate 2A In a first step, Norwegian marble rocks of the region of Molde, Norway having a diameter of 10 mm to 300 mm are autogenously dry ground (i.e. in absence of grinding media) to a fineness of a $d_{50}$ in the range of 42 μm to 48 μm.

The calcium carbonate obtained is wet ground in tap water at a calcium carbonate content of 10-15 wt.-% in a vertical attritor mill (Dynomill) in a recirculation mode without adding additives, such as dispersing and/or grinding aids to fineness until 60 wt.-% of the particles having a diameter <1 μm and 7 wt.-% of the particles having a diameter <0.2 μm. After grinding the product has a median diameter $d_{50}$ of 0.81 μm and a specific surface of 6.1 $m^2/g$.

Aqueous Suspension of Calcium Carbonate 2B (Prior Art)

The aqueous suspension of calcium carbonate 2A is mechanically concentrated by a filter press to a final calcium carbonate content of 72.8 wt.-% solids and dispersed under stirring by adding 0.38 wt.-% sodium salt of molar 1:1 polyacrylic acid/maleic acid copolymer (Mw 12 000), as dispersing agent. After six hours the S value was determined. The following Table 4 shows the properties of the aqueous suspension of dispersed calcium carbonate and the corresponding calcium carbonate content of the suspension and coating colour and its light scattering coefficient:

| Suspension solids content in wt.-% | Coating colour solids content in wt.-% | S at 20 $g/m^2$ coat weight in $m^2/kg$ |
| --- | --- | --- |
| 72.8 | 63.0 | 133.0 |

Aqueous Suspension of Calcium Carbonate 2C (Prior Art)

The aqueous suspension of calcium carbonate 2A is mechanically concentrated by a filter press to a final calcium carbonate content of 65.0 wt.-% solids and dispersed under stirring by adding 0.38 wt.-% sodium salt of molar 1:1 polyacrylic acid/maleic acid copolymer (Mw 12 000), as dispersing agent. After six hours the S value was determined. The following Table 5 shows the properties of the aqueous suspension of dispersed calcium carbonate and the corresponding calcium carbonate content of the suspension and coating colour and its light scattering coefficient:

| Suspension solids content in wt.-% | Coating colour solids content in wt.-% | S at 20 $g/m^2$ coat weight in $m^2/kg$ |
| --- | --- | --- |
| 65.0 | 63.0 | 149.0 |

Aqueous Suspension of Calcium Carbonate 2D (Invention)

The aqueous suspension of calcium carbonate 2A is mechanically concentrated by a filter press to a final calcium carbonate content of 72.8 wt.-% solids and dispersed under stirring by adding 0.38 wt.-% sodium salt of molar 1:1 polyacrylic acid/maleic acid copolymer (Mw 12 000), as dispersing agent. Additionally, the concentrated aqueous suspension of calcium carbonate is diluted by using distilled water to a final calcium carbonate content of 65.6 wt.-% solids and contacted with 0.5 wt.-% potassium carbonate, based on the total weight of the aqueous suspension of dispersed calcium carbonate. After six hours the S value was determined. The following Table 6 shows the properties of the aqueous suspension of dispersed calcium carbonate and the corresponding calcium carbonate content of the suspension and coating colour and its light scattering coefficient:

| Suspension solids content in wt.-% | Coating colour solids content in wt.-% | S at 20 $g/m^2$ coat weight in $m^2/kg$ |
| --- | --- | --- |
| 65.6 | 63.5 | 141.0 |

Aqueous Suspension of Calcium Carbonate 2E (Invention)

The aqueous suspension of dispersed calcium carbonate 2D was further stored for additional 9 days and the S value was determined after this period. The following Table 7 shows the properties of the aqueous suspension of dispersed calcium carbonate and the corresponding calcium carbonate content of the suspension and coating colour and its light scattering coefficient:

| Suspension solids content in wt.-% | Coating colour solids content in wt.-% | S at 20 $g/m^2$ coat weight in $m^2/kg$ |
| --- | --- | --- |
| 65.6 | 63.5 | 137.0 |

The invention claimed is:

1. A process for obtaining a diluted aqueous suspension of dispersed calcium carbonate, from a concentrated dispersed calcium carbonate suspension, providing improved optical properties to coatings made from the diluted aqueous suspension of dispersed calcium carbonate, the process comprising the steps of:
   a) providing an aqueous suspension comprising dispersed calcium carbonate and at least one dispersing agent, wherein the aqueous suspension has a solids content of between 65 wt.-% and 85 wt.-%, based on the total weight of the aqueous suspension;
   b) providing at least one alkali carbonate and/or alkali hydrogen carbonate, wherein the alkali ion is selected from potassium and/or sodium;
   c) diluting the aqueous suspension of dispersed calcium carbonate and the at least one dispersing agent with water; and
   d) before and/or during and/or after step c), contacting the aqueous suspension of dispersed calcium carbonate and the at least one dispersing agent with the at least one alkali carbonate and/or alkali hydrogen carbonate, to obtain an aqueous suspension of dispersed calcium carbonate having a pH value of 7.5 to 12.

2. The process according to claim 1, wherein the aqueous suspension of dispersed calcium carbonate and the at least one dispersing agent provided in step a) has a solid content of between 65 wt.-% and 80 wt.-%, based on the total weight of the aqueous suspension of step a).

3. The process according to claim 1, wherein the aqueous suspension of dispersed calcium carbonate and the at least one dispersing agent provided in step a) has a solid content of between 68 wt.-% and 78 wt.-%, based on the total weight of the aqueous suspension of step a).

4. The process according to claim 1, wherein the aqueous suspension of dispersed calcium carbonate and the at least one dispersing agent provided in step a) has a solid content of between 70 wt.-% and 78 wt.-%, based on the total weight of the aqueous suspension of step a).

5. The process according to claim 1, wherein the at least one alkali carbonate and/or alkali hydrogen carbonate is sodium carbonate, potassium carbonate, sodium hydrogen carbonate, potassium hydrogen carbonate or any mixture thereof.

6. The process according to claim 1, wherein the at least one alkali carbonate and/or alkali hydrogen carbonate is sodium carbonate and/or potassium carbonate.

7. The process according to claim 1, wherein the at least one alkali carbonate and/or alkali hydrogen carbonate is added in an amount of between 0.001 wt.-% and 5 wt.-%, based on the dry weight of the calcium carbonate in the suspension of step a).

8. The process according to claim 1, wherein the at least one alkali carbonate and/or alkali hydrogen carbonate is added in an amount of between 0.025 wt.-% and 2 wt.-%, based on the dry weight of the calcium carbonate in the suspension of step a).

9. The process according to claim 1, wherein the at least one alkali carbonate and/or alkali hydrogen carbonate is added in an amount of between 0.05 wt.-% and 1 wt.-%, based on the dry weight of the calcium carbonate in the suspension of step a).

10. The process according to claim 1, wherein the at least one alkali carbonate and/or alkali hydrogen carbonate is added in an amount of between 0.1 wt.-% and 0.5 wt.-%, based on the dry weight of the calcium carbonate in the suspension of step a).

11. The process according to claim 1, wherein the aqueous suspension of dispersed calcium carbonate and the at least one dispersing agent is first diluted in step c) and then contacted with the at least one alkali carbonate and/or alkali hydrogen carbonate in step d).

12. The process according to claim 1, wherein the aqueous suspension of dispersed calcium carbonate and the at least one dispersing agent is simultaneously diluted in step c) and contacted with the at least one alkali carbonate and/or alkali hydrogen carbonate in step d).

13. The process according to claim 1, wherein the aqueous suspension of dispersed calcium carbonate and the at least one dispersing agent is diluted in step c) immediately after contacting with the at least one alkali carbonate and/or alkali hydrogen carbonate in step d).

14. The process according to claim 1, wherein the aqueous suspension of dispersed calcium carbonate and the at least one dispersing agent is diluted in step c) within less than 45 minutes after complete addition of the at least one alkali carbonate and/or alkali hydrogen carbonate in step d).

15. The process according to claim 1, wherein the aqueous suspension of dispersed calcium carbonate and the at least one dispersing agent is diluted in one or more portions and the at least one alkali carbonate and/or alkali hydrogen carbonate is added in one or more portions.

16. The process according to claim 1, wherein the at least one dispersing agent is an organic dispersing agent, an inorganic dispersing agent or a mixture thereof.

17. The process according to claim 1, wherein the at least one dispersing agent is an organic dispersing agent comprising an acrylic polymer, a vinylic polymer, an acrylic and/or a vinylic copolymer and the inorganic dispersing agent comprises mono-, di- and/or trisodium orthophosphate, sodium tripolyphosphate and/or sodium polyphosphate.

18. The process according to claim 17, wherein acid sites of the at least one organic dispersing agent are partially or completely neutralized by sodium.

19. The process according to claim 1, wherein the aqueous suspension of dispersed calcium carbonate and the at least one dispersing agent of step a) is obtained by concentration of an aqueous suspension of calcium carbonate and the at least one dispersing agent.

20. The process according to claim 19, wherein the dispersing agent is added prior to the concentrating step.

21. The process according to claim 19, wherein the dispersing agent is added after the concentrating step.

22. The process according to claim 19, wherein the calcium carbonate and the at least one dispersing agent in the aqueous suspension are ground prior to the concentrating step.

23. The process according to claim 1, wherein the coating made from the aqueous suspension of dispersed calcium carbonate obtained by the process has a light scattering coefficient S of between 100 $m^2$/kg and 250 $m^2$/kg, for a coating weight of 20 g/$m^2$.

24. The process according to claim 1, wherein the coating made from the aqueous suspension of dispersed calcium carbonate obtained by the process has a light scattering coefficient S for a coating weight of 20 g/$m^2$ of at least 5 $m^2$/kg above the light scattering coefficient S of a resulting coating of a corresponding aqueous suspension of dispersed calcium carbonate being treated the same way but in the absence of at least one alkali carbonate and/or alkali hydrogen carbonate.

25. The process according to claim 1, wherein the coating made from the aqueous suspension of dispersed calcium carbonate obtained by the process has a light scattering coefficient S for a coating weight of 20 g/$m^2$ of at least 10 $m^2$/kg above the light scattering coefficient S of a resulting coating of a corresponding aqueous suspension of dispersed calcium carbonate being treated the same way but in the absence of at least one alkali carbonate and/or alkali hydrogen carbonate.

26. The process according to claim 1, wherein the coating made from the aqueous suspension of dispersed calcium carbonate obtained by the process has a light scattering coefficient S for a coating weight of 20 g/$m^2$ of at least 15 $m^2$/kg above the light scattering coefficient S of a resulting coating of a corresponding aqueous suspension of dispersed calcium carbonate being treated the same way but in the absence of at least one alkali carbonate and/or alkali hydrogen carbonate.

27. The process according to claim 1, wherein the coating made from the aqueous suspension of dispersed calcium carbonate obtained by the process has a light scattering coefficient S for a coating weight of 20 g/$m^2$ of at least 20 $m^2$/kg above the light scattering coefficient S of a resulting coating of a corresponding aqueous suspension of dispersed calcium carbonate being treated the same way but in the absence of at least one alkali carbonate and/or alkali hydrogen carbonate.

* * * * *